June 25, 1957   D. E. MILLER ET AL   2,796,712
ROLLING TAMPER

Filed Jan. 7, 1955   2 Sheets-Sheet 2

Delmer E. Miller
Gilbert T. Miller
INVENTORS

BY
Attorneys

United States Patent Office

2,796,712
Patented June 25, 1957

2,796,712

ROLLING TAMPER

Delmer E. Miller, West Lafayette, Ind., and Gilbert T. Miller, De Witt, Mo.

Application January 7, 1955, Serial No. 480,472

1 Claim. (Cl. 55—77)

This invention relates generally to an agricultural implement, and more specifically provides a rolling or tamping device which acts as a packing device for ground surfaces for use in packing soil loosened by cultivators, thereby eliminating damage to the soil by the cultivators.

In weed control on row crops, such as cotton, corn, soybeans and the like, a cultivator is generally used for the primary purpose of severing the roots of weeds below the surface of the ground. In severing the weed roots, it disturbs and agitates the ground to a depth of several inches and leaves a large surface area exposed to the air. Since a large surface area of the ground is exposed to the air, the ground dries to a depth endangering the root systems of the various crops, and especially in the case of immature crops or crops having relatively small root systems. Also, this drying out process damages or leeches the fertilizers and the plant food normally appearing in the soil. Accordingly, it is the primary object of the present invention to eliminate the deleterious effects of the agitation of the soil by the cultivators by providing a packing device which follows the cultivators for pressing and packing the soil in order that a relatively smaller area is exposed to the drying air.

Another object of the present invention is to provide a rolling tamper that is especially adapted for tractor mounting and including spring loaded bearing members for supporting individual portions of the roller or tamping elements so that an equal pressure will be exerted on the ground surface regardless of the irregularities of the terrain being traversed.

Another important feature of the present invention is the provision of a rolling tamper incorporating compression springs, loaded journal bearings for permitting sections of the roller to apply even pressure to the surface of the ground and absorb any shocks or irregularities by permitting individual units of the device to move in relation to the other units.

Another feature of the present invention is the provision of a rolling device constructed of three independent units that are spaced somewhat from each other and are resiliently mounted for independent resilient movement and especially adapted for mounting on a tractor behind the cultivators usually mounted under or forwardly of a tractor.

Other important objects of the present invention will reside in its simplicity of construction, efficiency of operation, ease of attachment, its adaptation for its specific purpose and its relatively inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
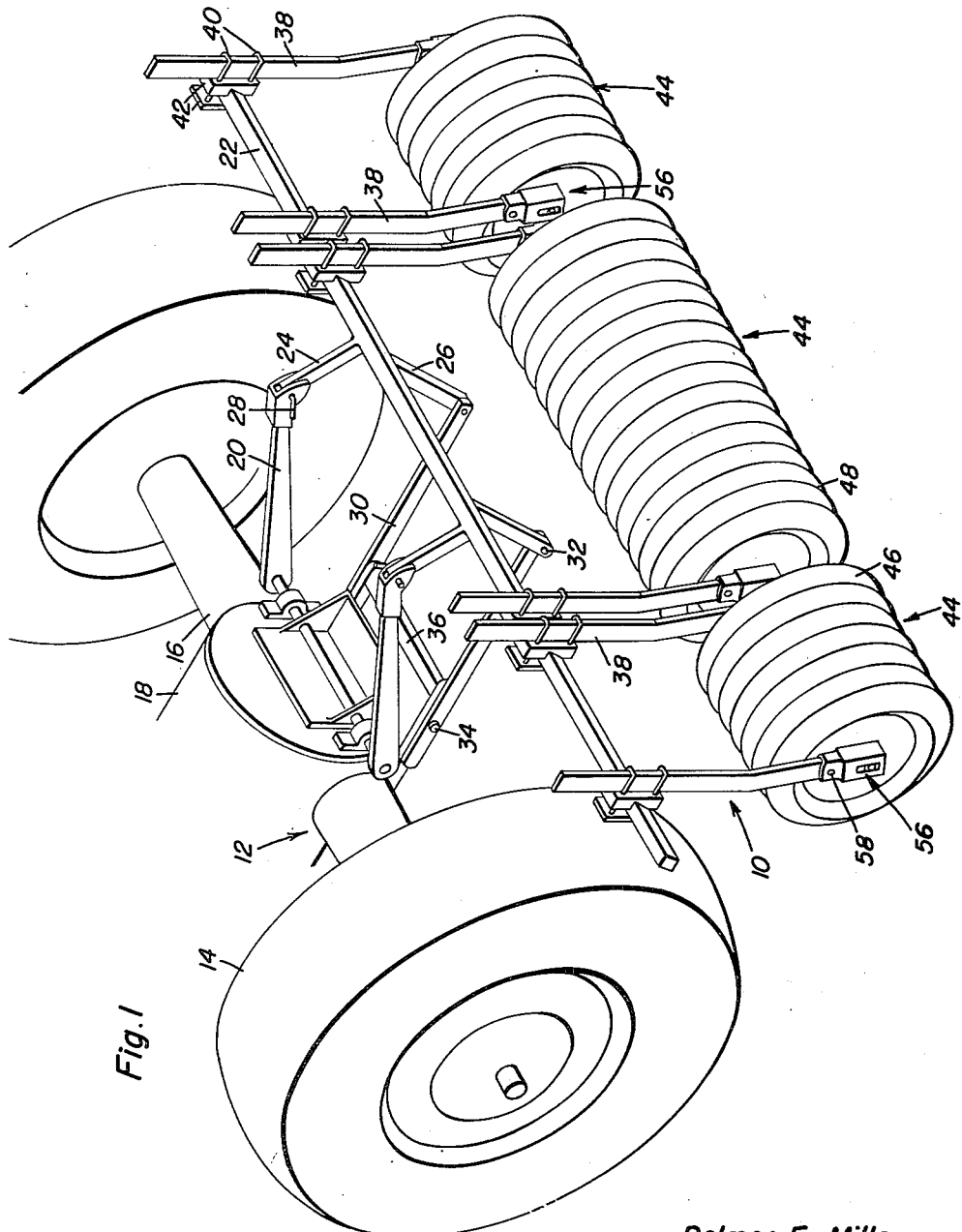
Figure 1 is a perspective view of the rear portion of a tractor with the rolling tamper of the present invention mounted in position thereon.

Referring now specifically to the drawings, it will be seen that the numeral 10 generally designates the rolling tamper of the present invention for attachment to the rear end of a tractor generally designated by the numeral 12 and including the usual ground engaging driving and supporting wheels 14, an axle housing 16, and a differential housing 18 with rearwardly projecting lift arms 20 projecting therefrom. The specific detail of the tractor 12 forms no part of the present invention and is illustrated to show one manner of attaching the rolling tamper 10 of the present invention to a tractor 12.

The rolling tamper 10 generally includes an elongated transverse mounting bar 22 of generally polygonal cross-sectional shape and provided with a pair of upwardly and forwardly extending arms 24 and a pair of downwardly and forwardly extending arms 26 wherein the forwardly and upwardly projecting arms 24 are connected to the lift arms 20 by removable pins 28 while the downwardly and forwardly projecting arms 26 are attached to supporting arms 30 by pivot pins 32 wherein the supporting arms 30 are attached by pivot members 34 to a frame portion 36 of the tractor 12. By utilizing the lift arms 20, the mounting bar 22 and the entire rolling tamper 10 of the present invention may be raised or lowered in relation to the ground surface for transporting the device or using the device in the usual manner.

Secured along the mounting bar 22 is a plurality of vertically extending and depending bracket members 38 each of which is attached to the mounting bar 22 by a pair of U-bolts 40 together with a pair of clamp adapters 42 wherein the adapters 42 engage opposite surfaces of the mounting bar 22 and the U-bolt 40 extends above and below the mounting bar 22 and projects through the clamp adapters 42 for supporting the bracket members 38 in vertically adjusted position. As illustrated, three pairs of vertically extending brackets 38 are provided, and each pair of brackets 38 supports a rolling unit, as generally indicated by the numeral 44. There are three rolling units 44 with the two outer rolling units 44 being of equal size and length and the center rolling unit 44 being substantially longer than the two outer rolling units 44. It also will be noted that the outer rolling units 44 are spaced from the central rolling unit 44 for receiving a row crop therebetween wherein the soil adjacent each side and between two adjacent rows will be packed at the same time substantially in the nature of a two-row cultivator, and it will be seen that the tamping roller of the present invention is adapted to pack the soil cultivated by a two-row cultivator that is mounted forwardly on the tractor 12 and is not shown in the present drawings. Each of the rolling units 44 is constructed of a plurality of packing elements 46 which are provided with a peripheral rib 48 on the outer surface thereof that is formed by a pair of concave surfaces 50 and 52 on each side thereof wherein the rib 48 together with the concave surfaces 50 and 52 will form a packing element. Each of the packing elements 46 is mounted on a transverse axle 54 that is supported on bearing journal members generally indicated by the numeral 56 that are attached to the lower ends of the supporting brackets 38 by fastening means 58.

Figure 2:
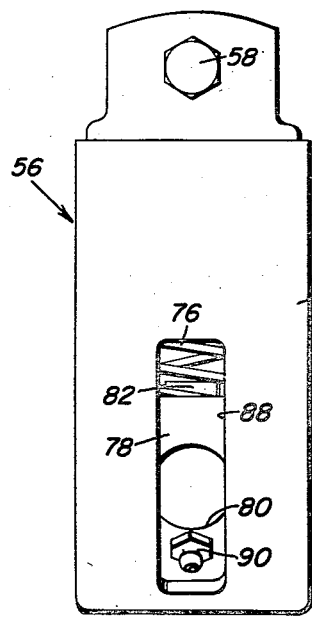
Figure 2 is a side elevational view showing one of the spring loaded bearing journals of the present invention.
Figure 3:
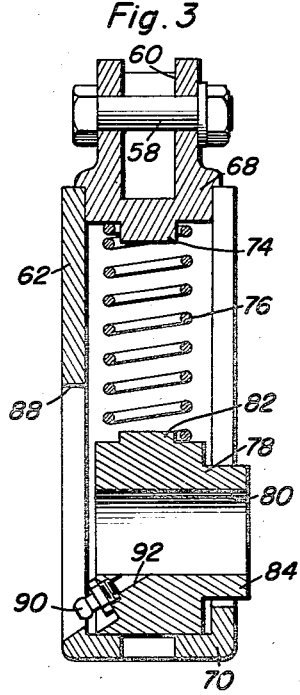
Figure 3 is a longitudinal, vertical sectional view along a longitudinal center line of the construction of Figure 2 showing the details of construction of one of the spring loaded bearing journal members.
Figure 4:
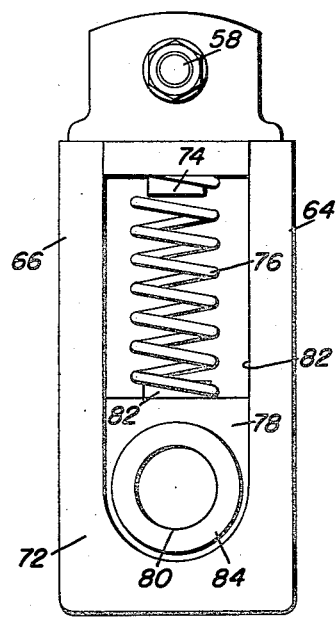
Figure 4 is a side elevational view of the construction of Figure 2 showing the reverse or inner side thereof.
Figure 5:
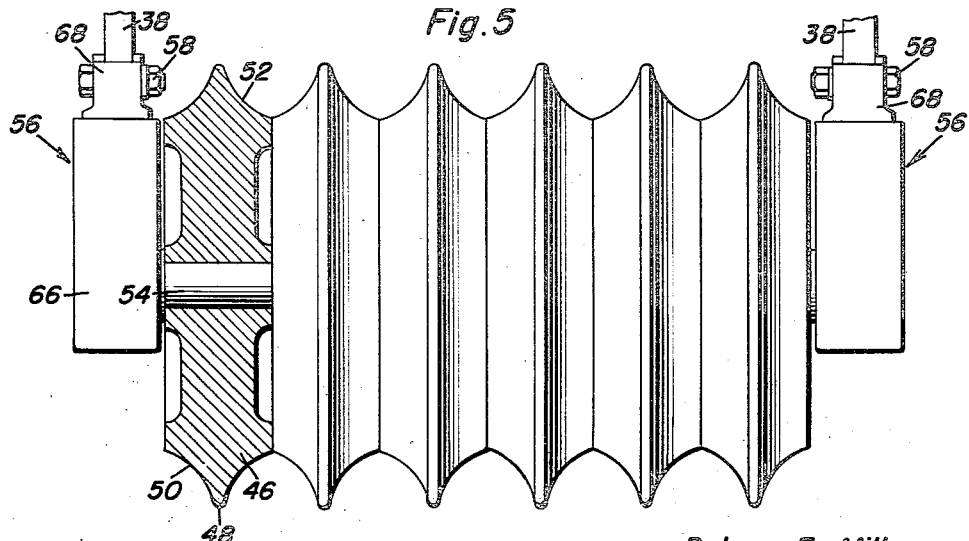
Figure 5 is an enlarged elevational view of one section of the rolling tamper of the present invention with one of the packing elements being sectioned to show the construction thereof.

As illustrated in Figures 2–4, each of the bearing journal elements 56 includes an upper socket 60 for receiving the fastening bolts 58 for attaching the device to the lower end of the supporting bracket 38. The bearing journal 56 is generally a hollow member formed by side walls 62, front walls 64, rear walls 66, top member 68, bottom member 70, and inwardly extending side members 72 on the inner wall thereof which is opposite from the side wall 62.

The top member 68 is provided with a depending cylindrical boss 74 on the undersurface thereof which forms a seat and positioning means for a compression coil spring 76 mounted therein. Slidably positioned within the hollow casing defined by the walls 62—72 is a bearing member 78 having a cylindrical bore 80 therein for receiving the end of the axle 54 in a rotational manner. The upper surface of the bearing member 78 is provided with a projecting boss 82 in opposition and alignment with the boss 74, thereby providing a seat for the other end of the compression spring 76 wherein the bearing member 78 is spring loaded and spring urged towards the bottom 70 of the bearing journal 56. A portion of the journal 78 designated by the numeral 84 projects outwardly on the inner surface of the bearing journal 56 through the slot 86 defined by the inwardly projecting side wall portions 72 thereby permitting vertical movement of the bearing journal 78. The side wall 62 is also provided with a vertically elongated slot 88 which slidably receives a lubrication fitting 90 inserted into an inclined bore 92 in the bearing 78 for lubricating the end of the axle 54 positioned in the bearing 78. It will be seen that the bearing 78 permits resilient movement of the axle 54 thereby permitting the packing element 46 and the rolling units 44 to exert an even pressure upon the ground surface, regardless of the irregularities of the ground surface being traversed by the rolling tamper 10.

In operation, the rolling tamper 10 of the present invention follows the cultivating unit for repacking the soil agitated by the cultivating unit, thereby eliminating damage of the root systems of the row crop caused by drying out of the moisture and leeching of the fertilizer. The compression coil spring 76 permits resilient movement of the rolling units 44 in relation to each other and independently of each other, thereby permitting the rolling units 44 formed by the packing units 46 to exert an even pressure against the ground surface regardless of the irregularities thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A ground packing device for attachment to a tractor comprising an elongated transverse mounting bar adapted to be attached to a tractor, a plurality of pairs of depending brackets attached to said mounting bar, a rolling unit positioned between the lower ends of each pair of brackets, and means resiliently journaling the ends of the rolling units on the brackets for permitting independent resilient movement of each of said units, said journaling means including an axle extending from the end of said unit, a hollow bearing casing removably attached to the bracket, a bearing vertically slidably positioned in said casing and rotatably receiving the end of the axle therein, and a compression spring urging the bearing against the bottom of the bearing casing thereby retaining the rolling unit in a normal position and permitting resilient movement of the rolling unit to follow the contour of the ground surface and exerting even pressure thereon, each of said bearing casings having a vertical slot in the inner wall thereof, and said bearing having a projecting cylindrical portion disposed in the slot for guiding the vertical movement of said bearing, said casing having a downwardly extending socket in the upper end thereof for telescopic engagement over the lower end of the bracket, and means for detachably fastening said socket and bracket together, the upper end of said bearing and the inner surface of the top of the casing having projections extending into the ends of the compression coil spring for positioning the spring.

References Cited in the file of this patent
UNITED STATES PATENTS

| | | |
|---|---|---|
| 718,870 | Packer | Jan. 20, 1903 |
| 1,237,182 | Dunham | Aug. 14, 1917 |
| 1,637,098 | Barnes | July 26, 1927 |